(12) United States Patent
Yoo (10) Patent No.: US 9,118,625 B2
(45) Date of Patent: Aug. 25, 2015

(54) ANTI-MALWARE SYSTEM, METHOD OF PROCESSING DATA IN THE SAME, AND COMPUTING DEVICE

(71) Applicant: SAMSUNG SDS CO., LTD., Seoul (KR)

(72) Inventor: In Seon Yoo, Seoul (KR)

(73) Assignee: SAMSUNG SDS CO., LTD., Seoul (KR)

(*) Notice: Subject to any disclaimer, the term of this patent is extended or adjusted under 35 U.S.C. 154(b) by 11 days.

(21) Appl. No.: 14/082,520

(22) Filed: Nov. 18, 2013

(65) Prior Publication Data

US 2014/0196149 A1 Jul. 10, 2014

Related U.S. Application Data

(60) Provisional application No. 61/727,917, filed on Nov. 19, 2012.

(51) Int. Cl.
| | | |
|---|---|---|
| G06F 11/00 | (2006.01) | |
| G06F 12/14 | (2006.01) | |
| G06F 12/16 | (2006.01) | |
| G08B 23/00 | (2006.01) | |
| H04L 29/06 | (2006.01) | |
| G06F 21/56 | (2013.01) | |

(52) U.S. Cl.
CPC .......... *H04L 63/0227* (2013.01); *G06F 21/566* (2013.01); *G06F 21/567* (2013.01)

(58) Field of Classification Search
CPC ..... G06F 21/56; G06F 21/566; G06F 21/561; H04L 63/145; H04L 63/1416
USPC .......................................................... 726/24
See application file for complete search history.

(56) References Cited

U.S. PATENT DOCUMENTS

| | | | | |
|---|---|---|---|---|
| 2009/0077544 | A1* | 3/2009 | Wu .............................. | 717/160 |
| 2009/0083852 | A1* | 3/2009 | Kuo et al. ..................... | 726/22 |
| 2012/0255017 | A1* | 10/2012 | Sallam ........................... | 726/24 |
| 2012/0331007 | A1* | 12/2012 | Billa et al. .................... | 707/797 |
| 2014/0025939 | A1* | 1/2014 | Smith et al. .................... | 713/2 |

FOREIGN PATENT DOCUMENTS

| | | |
|---|---|---|
| KR | 2003-0077292 A | 10/2003 |
| KR | 10-2005-0085015 A | 8/2005 |
| KR | 10-0750377 B1 | 8/2007 |
| KR | 10-2010-0112254 A | 10/2010 |
| KR | 10-2011-0032732 A | 3/2011 |

OTHER PUBLICATIONS

Communication dated Apr. 17, 2015 issued by Korean Intellectual Property Office in counterpart Korean Application No. 10-2013-0139280.
Communication dated Apr. 8, 2015 issued by Korean Intellectual Property Office in counterpart Korean Application No. 10-2013-0139278.

* cited by examiner

*Primary Examiner* — Kambiz Zand
*Assistant Examiner* — Stephen Sanders
(74) *Attorney, Agent, or Firm* — Sughrue Mion, PLLC (57) ABSTRACT

Provided are an anti-malware (AM) system, a method of processing data in the AM system, and a computing device including the AM system. The AM system includes a hardware-based AV engine configured to perform hash matching on data for AV scanning of the data, and an AV function module configured to determine whether or not the data includes a virus pattern on the basis of a result of the hash matching.

26 Claims, 5 Drawing Sheets

Fig. 6

ANTI-MALWARE SYSTEM, METHOD OF PROCESSING DATA IN THE SAME, AND COMPUTING DEVICE

CROSS-REFERENCE TO RELATED APPLICATION

This application claims priority to and the benefit of U.S. Provisional Patent Application No. 61/727,917 filed on Nov. 19, 2012, the disclosure of which is incorporated herein by reference in its entirety.

BACKGROUND

1. Field

The present disclosure relates to a system for use in providing a security solution, and more particularly, to a system including a hardware-based anti-virus (AV) engine and to a method of processing data in such a system.

2. Discussion of Related Art

With the spread of the Internet, the number of pieces of malware or malicious code, for example, a computer virus, a worm, a Trojan horse, a spyware program, a rootkit, a distributed denial of service (DDoS) attack, etc., designed to perform a malicious action against a user's intention, is drastically increasing, and, accordingly, there is a growing need for an anti-malware (AM) solution for effective security of a computer system.

In addition, with the widespread use of mobile devices such as a smartphone, a tablet, etc., it is deeply concerned that malware that has attacked personal computers (PCs) would also have severe harmful effects on the mobile devices. Thus, an effective AM solution is required for the mobile devices as well.

In general, AM solutions used in mobile devices are based on software. According to such a software-based solution, AM software is installed in a mobile device in the form of an application and performs malware detection.

Mobile devices have relatively strict limitations on resources such as a central processing unit (CPU), a battery, and so on. Due to the limited resources, software-based AM solutions in the mobile devices may have reduced sets of functions, as compared to those in PCs. For example, a software-based AM solution of a mobile device is programmed to detect malware only when an application is executed in the mobile device or a file is downloaded to the mobile device via the Internet, and does not carry out a real-time check for malware threats. This is because a heavy load of the real-time check operation would result in a nuisance to other operations performed in the mobile device.

SUMMARY

One or more exemplary embodiments may overcome the above disadvantages and other disadvantages not described above. However, it is understood that one or more exemplary embodiments are not required to overcome the disadvantages described above, and may not overcome any of the problems described above.

The present disclosure is directed to providing improved AV performance in a computing device having limited resources.

Further, the present disclosure is directed to performing, at a hardware-based AV engine, certain operations for providing an AV function at a high speed, and to implementing other AV operations on a software level of a platform including the AV engine so that various security solutions can be provided.

According to an exemplary embodiment, there is provided an anti-malware (AM) apparatus including: a hardware-based anti-virus (AV) engine configured to perform hash matching on data for AV scanning of the data, and to generate a hash matching result; and an AV function module configured to determine whether the data includes a virus pattern, on the basis of the hash matching result.

According to an aspect of the AM apparatus, the hardware-based AV engine includes: a hash loader configured to perform a first hash matching operation on a first portion of the data, and a suffix matcher configured to perform a second hash matching operation on a second portion of the data in response to detecting that a matching occurs in the first hash matching operation, the second portion of the data being subsequent to said first portion of the data.

According to an aspect of the AM apparatus, the hardware-based AV engine further includes an AV digest unit configured to calculate a message digest of the data.

According to an aspect of the AM apparatus, said first portion of the data, when input to the hash loader, is input to the AV digest unit; and the calculation of the message digest is performed in parallel with at least one of the first hash matching operation and the second hash matching operation.

According to an aspect of the AM apparatus, the AV digest unit temporarily pauses the hash loader to prevent the hash loader from performing a hash matching operation on a subsequent portion of the data while the AV digest unit is calculating the message digest.

According to an aspect of the AM apparatus, the AV function module loads, for use by the hardware-based AV engine, at least one of a hash matching database and the virus pattern.

According to an aspect of the AM apparatus, the AV function module is implemented as firmware.

According to an aspect of the AM apparatus, the AV function module is implemented as an application, said application being executed by an external CPU in cooperation with the hardware-based AV engine.

According to an aspect of the AM apparatus, the hardware-based AV engine includes a central processing unit (CPU) and a memory, and wherein the firmware implementing the AV function module is stored in the memory.

According to an aspect of the AM apparatus, the hardware-based AV engine is integrated with a processor, and wherein the processor includes a security execution environment module configured to virtualize the processor into different processors respectively corresponding to a normal mode and a security mode.

According to an aspect of the AM apparatus, the virtualized processor corresponding to the security mode is configured to execute an application received by the AM apparatus.

According to an aspect of the AM apparatus, the AM apparatus further includes a storage device connected to the processor, wherein the security execution environment module further virtualizes the storage device into different storage devices respectively corresponding to the normal mode and the security mode.

According to an aspect of the AM apparatus, the virtualized storage device corresponding to the security mode stores at least one of a library related to the AM apparatus, a driver related to the AM apparatus, and the virus pattern.

According to another exemplary embodiment, there is provided a method of processing data in an AM apparatus including: performing, hash matching on data for AV scanning of the data, with a hardware-based anti-virus (AV) engine; generating a hash matching result; and determining, at an AV function module, whether the data includes a virus pattern, on the basis of a the hash matching result.

According to an aspect of the method, the performing of the hash matching includes: performing, at a hash loader of the hardware-based AV engine, a first hash matching operation on a first portion of the data; performing, at a suffix matcher of the hardware-based AV engine, a second hash matching operation on a second portion of the data in response to detecting that a matching occurs in the first hash matching operation, the second portion of the data being subsequent to said first portion of the data.

According to an aspect of the method, the method further includes calculating, at an AV digest unit of the hardware-based AV engine, a message digest of the data.

According to an aspect of the method, said first portion of the data, when input to the hash loader, is input to the AV digest unit; and the calculation of the message digest is performed in parallel with at least one of the first hash matching operation and the second hash matching operation.

According to an aspect of the method, the method further includes using the AV digest unit to temporarily pause the hash loader to prevent the hash loader from performing a hash matching operation on a subsequent portion of the data while the AV digest unit is calculating the message digest.

According to an aspect of the method, the method further includes loading at least one of a hash matching database and the virus pattern for use by the hardware-based AV engine.

According to an aspect of the method, the method further includes providing the AV function module implemented as firmware.

According to an aspect of the method, the method further includes providing the AV function module implemented as an application, said application being executed by an external CPU in cooperation with the hardware-based AV engine According to an aspect of the method, the hardware-based AV engine includes a central processing unit (CPU) and a memory, and wherein the providing of the AV function module includes storing the firmware in the memory.

According to an aspect of the method, the method further includes: using a security execution environment module to virtualize a processor integrated with the hardware-based AV engine into different processors respectively corresponding to a normal mode and a security mode, wherein the security execution environment module is included in the processor.

According to an aspect of the method, the method further includes executing an application using the AM apparatus on the virtualized processor corresponding to the security mode.

According to an aspect of the method, the method further includes virtualizing, at the security execution environment module, a storage device connected to the processor into different storage devices respectively corresponding to the normal mode and the security mode.

According to an aspect of the method, the method further includes storing at least one of a library related to the AM apparatus, a driver related to the AM apparatus, and the virus pattern in the virtualized storage device corresponding to the security mode.

According to still another exemplary embodiment, there is provided a computing device including: a CPU core, and an anti-malware (AM) apparatus configured to provide a security platform on which an anti-virus (AV) software application is executed; wherein the AM apparatus includes: a hardware-based AV engine configured to perform hash matching on data for AV scanning of the data, and to generate a hash matching result; and an AV function module configured to determine whether the data includes a virus pattern on the basis of the hash matching result.

BRIEF DESCRIPTION OF THE DRAWINGS

The above and other objects, features, and advantages of the exemplary embodiments of the present disclosure will become more apparent to those familiar with this field from the following detailed description when taken in conjunction with the accompanying drawings, in which.

DETAILED DESCRIPTION OF EXEMPLARY EMBODIMENTS

Exemplary embodiments of the present disclosure will be described in detail below with reference to the accompanying drawings. However, the embodiments are merely examples and are not to be construed as limiting the present disclosure.

Various details already understood by those familiar with this field will be omitted to avoid obscuring the gist of the present disclosure. Terminology described below is defined considering functions in the present disclosure and may vary according to a user's or operator's intention or usual practice. Thus, the meanings of the terminology should be interpreted based on the overall context of the present specification.

The spirit of the present disclosure is determined by the claims, and the following exemplary embodiments are provided only to efficiently describe the spirit of the present disclosure to those of ordinary skill in the art.

Figure 1:
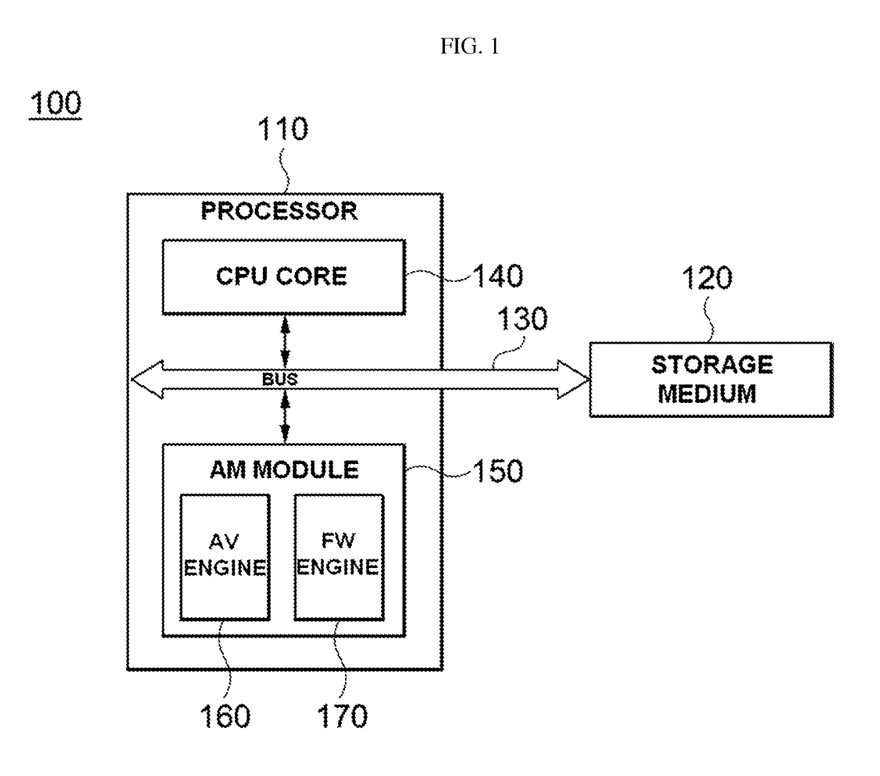
FIG. 1 is a diagram showing an example of an AM system that performs AM functions on the basis of hardware according to an exemplary embodiment of the present disclosure.

FIG. 1 is a diagram showing an example of an AM system that performs AM functions on the basis of hardware according to an exemplary embodiment of the present disclosure.

An AM system 100 includes a processor 110 such as an application processor, a storage medium 120 such as a read-only memory (ROM) and/or a random access memory (RAM), and a bus 130 that connects various hardware components including the storage medium 120 to the processor 110. The processor 110 may include at least one CPU core 140. The storage medium 120 may include many different types of storage media having different performance characteristics. The bus 130 may include a memory bus or memory controller, a peripheral bus, and a local bus using any of various bus architectures.

The storage medium 120 of the AM system 100 is configured to store instructions executable by a processing unit such as the processor 110. For example, the instructions stored in the storage medium 120 may include instructions of an operating system (OS) for operating the various components, and instructions of AM software running on the OS. As will be described later, the AM software may be configured to provide AM functions to a user of the AM system 100. In certain embodiments, drivers for the hardware components, libraries, firmware, and various types of application software may be stored in the storage medium 120. In accordance with different embodiments, the drivers, the libraries, the firmware and/or the application software may be stored in a different storage medium.

The AM system 100 further includes an AM module 150 for malware detection. As shown in FIG. 1, the AM module 150 may be included in the processor 110. The AM module 150 is connected through the bus 130 to the CPU core 140 and the storage medium 120. The AM module 150 includes at least one hardware-based engine, for example, an anti-virus (AV) engine 160 and/or a firewall (FW) engine 170. The AV engine 160 may perform hash matching on certain data for AV scanning of the data. The FW engine 170 may perform an FW function of filtering a packet. In a certain exemplary embodiment, the AM module 150 may be configured in the form of a system-on-chip (SoC). Such a SoC is configured as a single chip having hardware logic and firmware for malware detection. In another exemplary embodiment, the AM module 150 may be configured in the form of hardware logic (e.g., the AV engine 160 and/or the FW engine 170) only and may cooperate with certain software (e.g., an application) executed by an external CPU for malware detection.

The exemplary AM system 100 may be included in a computing device having stored thereon data and/or files to be scanned. The computing device may be a mobile device, such as a smartphone or a tablet, etc., an embedded device, a desktop computer, or so on.

Figure 2:
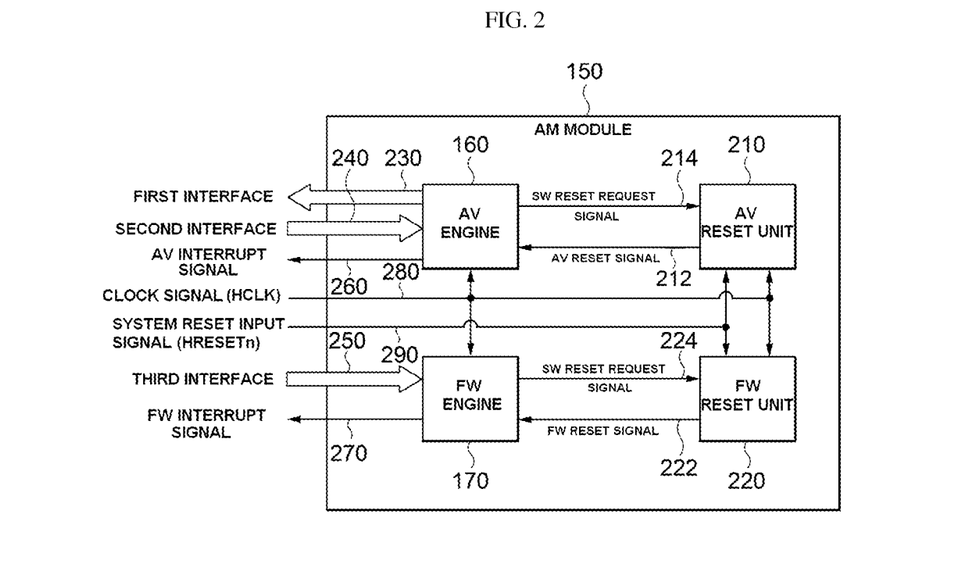
FIG. 2 shows a constitution of an AM module according to an exemplary embodiment of the present disclosure.

The exemplary AM module 150 may be constituted in various ways. For example, as shown in FIG. 2, the AM module 150 includes the AV engine 160 and the FW engine 170. In addition, the AM module 150 may further include an AV reset unit 210 and an FW reset unit 220.

In FIG. 2, the AV engine 160 and the FW engine 170 may operate independently of each other. The AV engine 160 reads data (e.g., the whole or a part of a database or a file) in word units (e.g., four bytes) from a master device (e.g., the storage medium 120 of the AM system 100) external to the AM module 150 through a first interface 230. The external master device may control the AV engine 160 and check a state of the AV engine 160 through a second interface 240, and control the FW engine 170 and check a state of the FW engine 170 through a third interface 250. The AV engine 160 and the FW engine 170 output an AV interrupt signal 260 and an FW interrupt signal 270, respectively.

The AV engine 160 and the FW engine 170 receive a clock signal HCLK 280. FIG. 1 shows that the clock signal 280 is used in common for the AV engine 160 and the FW engine 170, which is, however, merely illustrative.

The AV reset unit 210 may receive a software reset request signal 214 from the AV engine 160 and a system reset input signal HRESETn 290 from an external of the AM module 150 to provide an AV reset signal 212 to the AV engine 160. The FW reset unit 220 may receive a software reset request signal 224 from the FW engine 170 and the externally applied system reset input signal 290 to provide an FW reset signal 222 to the FW engine 170. FIG. 1 shows that the system reset input signal 290 is used in common for the AV reset unit 210 and the FW reset unit 220, which is, however, merely illustrative.

Certain exemplary embodiments involve integration of the AM module 150 and the processor 110. The AM module 150 may be integrated with the processor 110 in various ways. For example, as shown in FIG. 3 and FIG. 4, the AM module 150 may be integrated into the processor 110.

Figure 3:
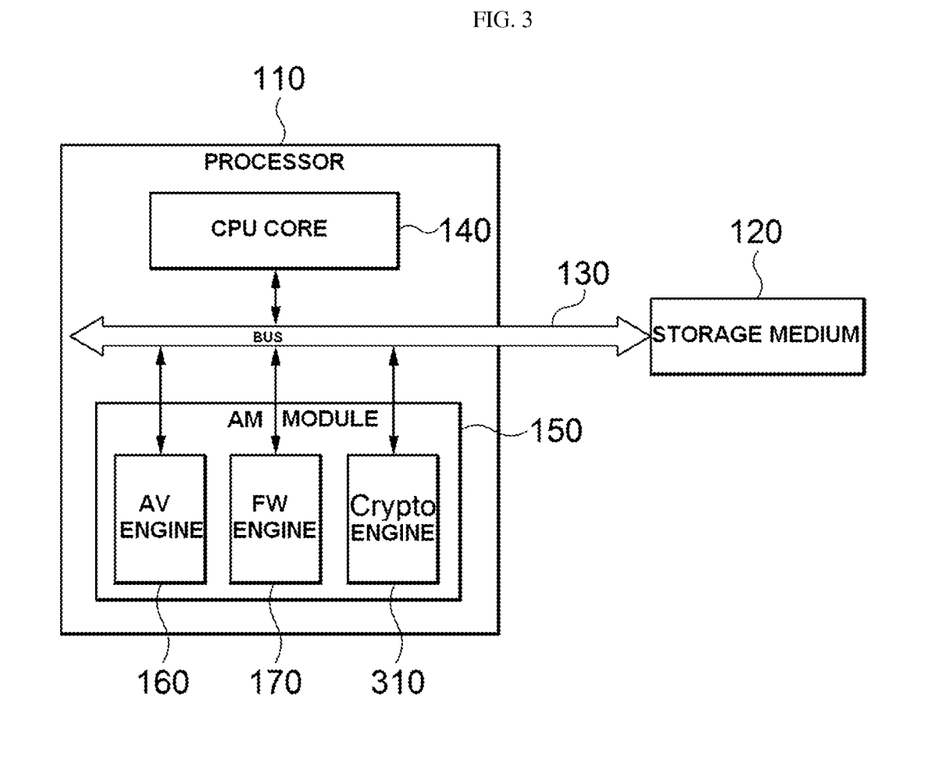
FIG. 3 illustrates a non-isolated scheme of integrating an AM module with a processor according to an exemplary embodiment of the present disclosure.

As an example, the AM module 150 illustrated in FIG. 3 is integrated with the processor 110 so that it can use the CPU core 140 in the processor 110 and a designated area of a certain memory (e.g., the storage medium 120) through the bus 130. This is referred to as a non-isolated scheme. According to the non-isolated scheme, the AV engine 160 and the FW engine 170 of the AM module 150 are connected to the CPU core 140 of the processor 110 through the bus 130, and also connected to an external memory (e.g., the storage medium 120) through the bus 130. The AM module 150 of FIG. 3 may have an additional engine (e.g., a crypto engine 310), which is also connected to the CPU core 140 and the storage medium 120 through the bus 130. According to the non-isolated scheme, the AM module 150 may enable relatively rapid data detection using the CPU core 140 of the processor 110.

Figure 4:
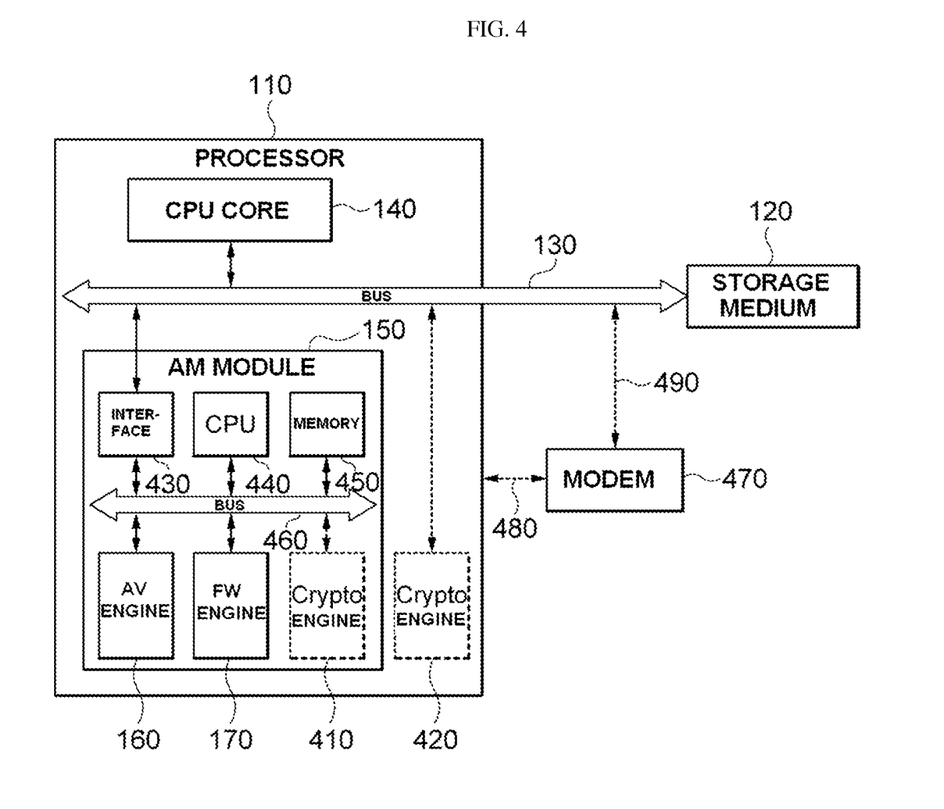
FIG. 4 illustrates an isolated scheme of integrating an AM module with a processor according to an exemplary embodiment of the present disclosure.

As another example, the AM module 150 illustrated in FIG. 4 is integrated with the processor 110 according to an isolated scheme. The AM module 150 itself of FIG. 4 includes a CPU 440 and a memory 450. According to the isolated scheme, the AM module 150 may use the CPU 440 and the memory 450 to reduce use of the CPU core 140 of the processor 110. According to the scheme shown in FIG. 4, the AV engine 160 and the FW engine 170 of the AM module 150 are connected through an internal bus 460 to the CPU 440, the memory 450, and an interface 430. The interface 430 connects the AM module 150 to the CPU core 140 and the storage medium 120 through the bus 130. Likewise, an additional engine (e.g., a crypto engine 410) included in the AM module 150 may be connected through the bus 460 to the interface 430, the CPU 440, and the memory 450 in the AM module 150. Alternatively, another engine (e.g., a crypto engine 420) located outside the AM module 150 may be directly connected to the bus 130 to use the CPU core 140 of the processor 110.

Meanwhile, a dotted line 480 of FIG. 4 denotes that the AM module 150 can be integrated with a modem 470 external to the processor 110. According to such a modem integration scheme, the AM module 150 is present between a network stack of the OS (not shown) and the modem 470, and may be used to detect a harmful packet for the security of the AM system 100 including the AM module 150. Further, according to the modem integration scheme, the usage of the CPU core 140 of the processor 110 is low. In this case, the AM module 150 may directly receive a network packet through the modem 470 and process the packet in the transport layer.

Alternatively, a dotted line 490 of FIG. 4 denotes that the AM module 150 is integrated with the processor 110 while the modem 470 is connected to the processor 110 through the bus 130. In this case, since the AM module 150 serves as a coprocessor (e.g., the CPU 440) in the AM system 100, the AM module 150 may detect a packet for use in the CPU core 140 of the processor 110, thereby facilitating network packet processing over layers including the application layer to the transport layer.

Figure 5:
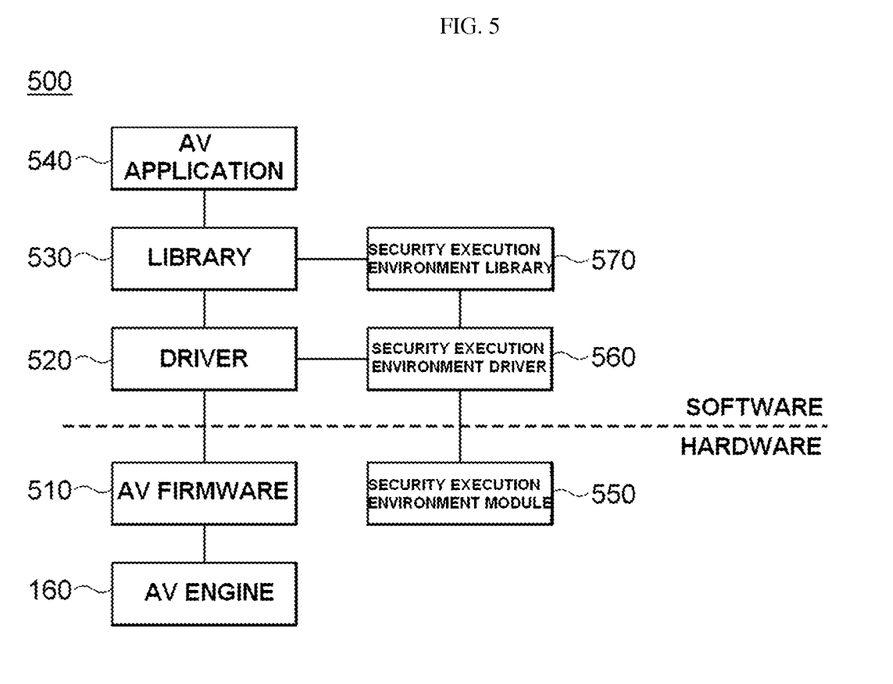
FIG. 5 illustrates a security platform provided by an AM system according to an exemplary embodiment of the present disclosure.

FIG. 5 illustrates a security platform provided by an AM system according to an exemplary embodiment of the present disclosure.

An exemplary security platform 500 includes a hardware level and a software level. Sub-modules of each level may be modified or extended according to the design of the platform 500. Such modules implement certain functions to be performed on the platform 500. In other words, certain functional modules operate on the platform 500. These functional modules are implemented at the hardware level or the software level of the platform 500. For example, an AV function may be performed on the platform 500, and to this end, the platform 500 operates a certain AV function module. Using the AV function module, an AV software application (e.g., an AV application 540) may be executed on the platform 500.

In the hardware level of the platform 500, a hardware-based AV engine 160 is included. An exemplary constitution of the hardware-based AV engine 160 will be described later. In the hardware level of the platform 500, an FW engine 170 may be further included, and a crypto engine(s) 310, 410 and/or 420 for performing encryption functions may be additionally included. The constitution of the platform 500 will be described below, particularly in terms of the AV function among the functions of the platform 500.

In the hardware level of the platform 500, AV firmware 510 may be further included. At the hardware level of the platform 500, the AV firmware 510 implements a functional module that performs certain operations for the AV function. The instructions of the AV firmware 510 may be stored in a certain memory and executed by a certain processing unit. For example, when the AM module 150 including the AV engine 160 is integrated with the processor 110 according to the isolated scheme, the instructions of the AV firmware 510 may be stored in the memory 450 of the AM module 150 and executed by the CPU 440 of the processor 110. By way of another example, when the AM module 150 including the AV engine 160 is integrated with the processor 110 according to the non-isolated scheme, the instructions of the AV firmware 510 may be stored in the storage medium 120 and executed by the CPU core 140 of the processor 110. However, it will be understood that the foregoing examples are illustrative and that variations may be made therein.

The software level of the platform 500 includes a driver 520, an AV library 530, and an AV application 540. The instructions of the driver 520, the instructions of the library 530 and the instructions of the AV application 540 may be stored in a certain memory (e.g., the storage medium 120) and executed by a certain processing unit (e.g., the processor 110). A functional module for performing certain operations for the AV function is implemented as software by the driver 520 and/or the library 530. Also, the driver 520 provides an interface with the hardware level of the platform 500. The AV application 540 is software for providing an AV solution on the basis of the platform 500. The AV application 540 may use and/or control the platform 500 through, for example, an AV application programming interface (API) provided by the library 530, and receive an output from the platform 500 using a callback function.

In the platform, the firmware 510, the driver 520, and/or the library 530 may implement operations that need to be frequently updated to cope with new malicious codes and strengthen security. According to how closely the AM module 150 is related with the processor 110 (e.g., how the AM module 150 is integrated with the processor 110), an operation to be performed on the platform 500 may be implemented in firmware at the hardware level or in a driver or a library at the software level.

In a certain exemplary embodiment, as will be described in further detail later, the hardware-based AV engine 160 performs hash matching operations on data for AV scanning of the data.

When the AM module 150 is integrated with the processor 110 according to the isolated scheme, some processing operations related to the above operations may be implemented by the AV firmware 510 at the hardware level. For example, certain operations performed after the hash matching operations may be implemented by the AV firmware 510, and other processing operations may be implemented by the library 530 and/or the driver 520. The operations of the AV function module implemented as the AV firmware 510 includes full matching of determining whether or not data includes a virus pattern (virus signature) on the basis of a result of performing hash matching on the data, and/or loading of a database for use in the hash matching and a database such as the virus patterns for use in the full matching.

Alternatively, certain processing operations including the full matching and/or the database loading may be implemented as software by the driver 520 and/or the library 530. For example, when the AM module 150 is integrated with the processor 110 according to the non-isolated scheme, the platform 500 may be configured in this manner.

A security solution based on the platform 500 may enable respective vendors to make the best use of advantages of the hardware-based AM module 150 in the course of developing various applications (e.g., the AV application 540). Thus, for the security solution, hardware-based improvement in its performance can be achieved while its unique security functions can be implemented as software.

Furthermore, the platform 500 may involve an enhanced security structure. A computing device including an AM system 100 that provides such a platform 500 is improved in the stability of security.

In an exemplary embodiment, a module 550 for providing a security execution environment to the hardware level of the platform 500 is included in the hardware level of the platform 500. The security execution environment module 550 may be included in the processor 110 integrated with the AV engine 160. The security execution environment module 550 may support platform authentication, generation/storage of a measurement value for integrity check, protection of data storage, and so on. The security execution environment module 550 interfaces with a higher level function (e.g., the AV function provided by the driver 520 and/or the library 530) through a security execution environment driver 560 and/or a security execution environment library 570.

The security execution environment module 550 allows the operating environment of (the CPU core 140 and/or the CPU 440) of) the processor 110 to have a normal mode and a security mode, and virtualizes the processor 110 into two processors corresponding to the respective modes. Applications at the software level of the platform 500 are executed on the virtualized processor corresponding to the normal mode or the security mode. In other words, applications at the software level of the platform 500 are logically classified as either normal or security applications, where the normal application and the security application may be respectively executed on the two virtualized processor as if they were executed on two separate processors. For example, the AV application 540 using the AM system 100 is executed by the virtualized processor corresponding to the security mode.

The security execution environment module 550 logically partitions a storage device or a peripheral device connected to (the CPU core 140 and/or the CPU 440 of) the processor 110, as well as the processor 110, and virtualizes the storage device or the peripheral device into devices corresponding to the respective modes.

Such logical partitioning enables the following. First, security-critical portions, for example, a certain library and/or driver (e.g., the library 530 and/or the driver 520), a key, FW rules, a virus signature database, etc., may be stored in the virtualized storage medium corresponding to the security mode. When the stored library and/or driver is installed or updated, performing an integrity checking process through a mechanism such as an electronic signature may prevent the contents of the library and/or driver from being tampered with or damaged or from being improperly updated. Likewise, when the virus signature database and the FW rules are updated, the tampering and improper update of their contents can be prevented. Also, it is possible to prevent the library, the drive, the FW rules, and the virus signature database from being updated by a source posing as a trustworthy update server. Furthermore, a process for authenticating an application operating in the normal mode may be executed in the security mode so as to prevent the application from being tampered with.

Figure 6:
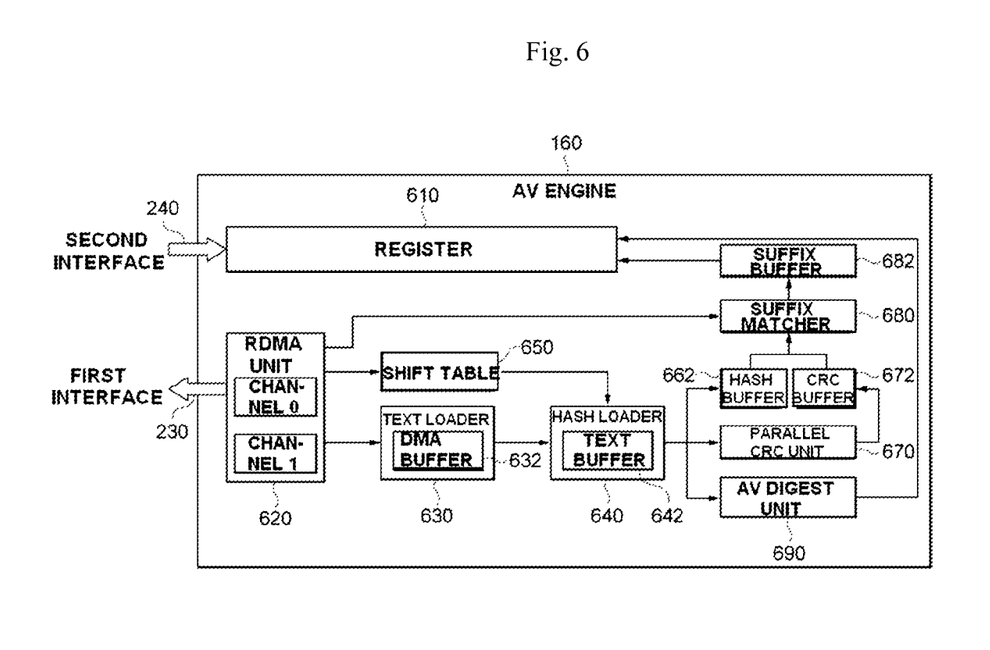
FIG. 6 shows a constitution of a hardware-based AV engine according to an exemplary embodiment of the present disclosure.

FIG. 6 shows a constitution of a hardware-based AV engine according to an exemplary embodiment of the present disclosure.

According to the hardware constitution shown in FIG. 6, the AV engine 160 includes a register 610, a remote direct memory access (RDMA) unit 620, a text loader 630, a direct memory access (DMA) buffer 632, a hash loader 640, a text buffer 642, a shift table 650, a hash buffer 662, a parallel cyclic redundancy check (CRC) unit 670, a CRC buffer 672, a suffix matcher 680, a suffix buffer 682, and an AV digest unit 690. The text loader 630 may include the DMA buffer 632. The hash loader 640 may include the text buffer 642. At least one of the DMA buffer 632, the text buffer 642, the hash buffer 662, the CRC buffer 672, and the suffix buffer 682 may be a first-in first-out (FIFO) type of queue.

The register 610 monitors a state of the AV engine 160, controls operations of the AV engine 160, and stores results of the operations performed therein.

Data to be scanned is read into a memory (e.g., the storage medium 120 or the memory 450) in units of a predetermined size (i.e., in scan units) and the positions of the data stored in the memory are delivered to the AV engine 160 by firmware (e.g., the AV firmware 510), a driver (e.g., the driver 520), and/or a library (e.g., the library 530). For example, when the text loader 630 of the AV engine 160 is notified of the start of scanning by a control register in the register 610, the text loader 630 accesses the positions at which the data to be scanned is stored through the RDMA unit 620, and loads the stored data. The read data is sequentially stored in the text buffer 642 via the DMA buffer 632 of the text loader 630.

Through the RDMA unit 620, a pattern database to be used by the hash loader 642 is transmitted/loaded from a memory external to the AV engine 160 to the shift table 650. Such database loading may be performed in advance by the firmware (e.g. the AV firmware 510), the driver (e.g., the driver 520), and/or the library (e.g., the library 530).

The hash loader 640 performs hash matching on the data stored in the text buffer 642. Specifically, the hash loader 640 performs a certain hash matching operation on a portion of the data for the hash matching of the data. Such hash matching operation is performed using the pattern database of the shift table 650. For example, for every byte (e.g., an i-th byte) in the text buffer 642, the hash loader 640 performs hash matching on the three successive bytes from the byte (e.g., from the i-th byte to an (i+2)-th byte). The hash loader 640 performs this hash matching operation to store, in the hash buffer 662, information including a match position where a matching has occurred during the hash matching operation, and the stored information is delivered to the suffix matcher 680. In parallel with this, the parallel CRC unit 670 calculates a CRC value (e.g., a 32-bit CRC value).

The CRC value calculated by the parallel CRC unit 670 is stored in the CRC buffer 672, and input to the suffix matcher 680, together with the value stored in the hash buffer 662. When the match result of the hash matching operation performed by the hash loader 640 is stored in the hash buffer 662, the suffix matcher 680 performs an additional hash matching operation on a portion subsequent to the portion on which the hash loader 640 has performed the hash matching operation (i.e., on text that follows the match position stored in the hash buffer 662), and stores, in the suffix buffer 682, the match result including a position at which another matching has occurred during the additional hash matching operation. The additional hash matching operation uses an additional pattern database stored in a suffix table (not shown). After an address of the suffix table is set in the AV engine 160 in advance, the additional pattern database is loaded from the address into the suffix matcher 680 through the RDMA unit 620.

In a certain exemplary embodiment, a set of the hash loader 640, the hash buffer 662, the parallel CRC unit 670, and the CRC buffer 672 operating between the text loader 630 and the suffix matcher 680 may be expanded. For example, a plurality of such sets may be arranged in a parallel structure.

Additionally, the AV digest unit 690 may calculate a message digest of (the whole or a specific section of) data in the text buffer 642 according to a designated hash algorithm. The AV digest unit 690 may support at least one of MD5, SHA1, SHA256, SHA284, and SHA512 as an algorithm for calculating the digest. The calculated digest may be accessed through an API on a needed basis.

The calculation of the message digest by the AV digest unit 690 may be performed in parallel with AV scanning of the data. To this end, when a certain portion of the data is input to the hash loader 640, the portion may also be input to the AV digest unit 690. Also, to prevent the hash loader 640 from performing a hash matching operation on the next part of the data while the AV digest unit 690 is calculating the message digest, the AV digest unit 690 may temporarily pause the hash loader 640.

On the match results stored in the suffix buffer 682, full matching may be performed. In certain exemplary embodiments, based on the suffix matching results stored in the suffix buffer 682, it is determined by the firmware, the driver, or the library whether or not the hash-matched data includes a pattern of a virus database (i.e., whether or not the hash-matched data completely matches a virus pattern). For example, such full matching may be implemented using the driver 520 and/or the library 530 at the software level of the platform 500, or implemented using the AV firmware 510 at the hardware level of the platform 500.

Meanwhile, when a mismatch occurs at the byte of the i-th position while the hash matching operations are performed by the hash loader 640 and the suffix matcher 680, a check for the current position, that is, the i-th position, is halted, and a check is performed for the next position, that is, the (i+1)-th position. For example, a hash matching operation may be performed on the three bytes from the (i+1)-th byte to the (i+3)-th byte by the hash loader 640, and an additional hash matching operation may be performed on subsequent text by the suffix matcher 680.

The AV engine 160 repeats the above process until it is notified of the last byte by the firmware (e.g., the AV firmware 510), the driver (e.g., the driver 520), and/or the library (e.g., the library 530).

Functional blocks that process data in the AV engine 160 will be described in further detail below.

RDMA Unit

In FIG. 6, the RDMA unit 620 has two Read DMA channels (CH0 and CH1) to alternately read stored data. One of the two channels (e.g., CH0) is used to read data from an external memory and store the read data in the DMA buffer 630 or the shift table 650, and the other (e.g., CH1) is used to refer to a pattern database of the external memory when matching is performed by the suffix matcher 680. Through the two channels, the RDMA unit 620 reads data from the external memory in word units, and may operate even for unaligned source addresses. For example, the RDMA unit 620 may support up to a 16 burst mode. When the two channels simultaneously request DMA, the RDMA unit 620 may process one of the channels (e.g., CH1) by priority.

Text Loader

The text loader 630 converts the data that is read and stored in the DMA buffer 632 by the RDMA unit 620 into a 3-byte structure, and adds the converted data into the text buffer 642 of the hash loader 640. For example, suppose that buffers in the AV engine 160 can read data in units of 32 bits (4 bytes). When input text of 2048 bytes is scanned, the text loader 630 shifts a 3-byte hash window one by one byte for the text that is input in units of four bytes, thereby generating 2048 3-byte units. Among the 2048 bytes of the whole text, the 2047th byte and the 2048th byte lack one byte and two bytes, respectively, to constitute the 3-byte hash window. Thus, the 3-byte structure is completed by inserting a dummy byte to the last one byte of the hash window in case of the 2047th byte, and inserting dummy bytes to the last two bytes of the hash window in case of the 2048th byte. A value of each dummy byte may be 8'hFF.

Hash Loader

The hash loader 640 calculates a hash value of the data of the 3-byte structure filling the text buffer 642, and checks whether a match occurs between the data and a certain pattern using the shift table 650. For example, the shift table 650 is a hash table storing a maximum of 65536 1-bit entries. The hash loader 640 indexes a specific bit in the shift table 650 using a hash value calculated from 3-byte data, determines that a match has occurred when a value stored in the bit is 0, and determines that a mismatch has occurred when the value stored in the bit is 1. When a match occurs, the result is stored in the hash buffer 662 and delivered to the suffix matcher 680. Subsequently, the suffix matcher 680 continuously performs a matching operation for data following the 3-byte data. For example, data stored in the hash buffer 662 is as shown in Table 1 below.

TABLE 1

| Name | Number of Bits | Function |
| --- | --- | --- |
| Hash_value | 16 | A hash value of 3-byte data read from the text buffer 642 |
| TEXT_offset | 21 | An offset of a position at which a match has occurred in the text buffer 642 |

When no match occurs in the hash loader 640, no subsequent hash matching is performed by the suffix matcher 680, and the hash loader 640 continuously checks the text in the next hash window.

Suffix Matcher

The suffix matcher 680 reads data stored in the hash buffer 662 and the CRC buffer 672, receives a certain size of text that follows a match position stored in the hash buffer 662 through the RDMA unit 620, and performs hash matching on the text with a virus pattern in the suffix table. When a matching occurs, the suffix matcher 680 adds, into the suffix buffer 682, a result including the match position. For example, the result of the suffix matching may be 50-bit data, which may be divided into two pieces of 25-bit data and added to the suffix buffer 682. One of the two pieces of 25-bit data is an index of an entry in a database storing an actual virus pattern matching with a hash value, and the other is an offset, with respect to the text position at which a matching has occurred, in a memory that stores the text. Subsequently, the result data read from the suffix buffer 682 may be expanded to 32 bits and delivered. For example, when full matching is performed by the firmware 510 or the library 530, the result data of 32 bits is used for the full matching so that the virus pattern database can be loaded and text can be read from the offset.

Parallel CRC Unit

The parallel CRC unit 670 may operate at the same speed as the scan speed of the text loader 630. Every time the text loader 630 stores 3-byte data in the text buffer 642, the parallel CRC unit 670 calculates a 32-bit CRC value of a 32-bit input consisting of 24 upper bits of the 3-byte data and 8 lower bits of 0. The calculated CRC value is added to the CRC buffer 672 every time a match occurs in the hash loader 640, and the result is added to the hash buffer 662.

For example, when a match occurs at the N-th 3-byte structured data of the text buffer 642 in the hash matching operation performed by the hash loader 640, the parallel CRC unit 670 stores a CRC value of a total of the four pieces of data, i.e., from the N-th 3-byte structure to the (N+3)-th 3-byte structure, in the CRC buffer 672 and delivers the CRC value to the suffix matcher 680. It is possible to store only the 16 upper bits of each CRC value in the CRC buffer 672 and discard the 16 lower bits, or vice versa. As a result, every time a match occurs in the hash loader 640, one record having a length of 6 bytes is added to the CRC buffer 672. Consequently, the suffix matcher 680 can recognize which record of the hash buffer 662 each record input to the CRC buffer 672 corresponds to.

AV Digest Unit

The AV digest unit 690 calculates a message digest of the whole or a partial section of input text while the input text is being scanned. The AV digest unit 690 may be activated by a user on a needed basis.

When the AV digest unit 690 is activated, data read from the text buffer 642 by the hash loader 640 to calculate a hash value may also be input to the AV digest unit 690, so that an operation of calculating a digest can be performed in parallel with a scanning operation. The digest calculation is gradually performed along with the scanning of text, and the digest may be provided when the scanning is completed. For example, when the AV digest unit 690 operates slower than the hash loader 640, the hash loader 640 may be prepared to scan the next position of input text while the calculation of the AV digest has not yet been finished. In this case, the AV digest unit 690 may generate a hold signal to temporarily pause the hash loader 640.

A digest value calculated by the AV digest unit 690 is stored in the register 610. The AV digest unit 690 may support algorithms such as MD5, SHA1, SHA256, SHA384, and/or SHA512. Among these algorithms, MD5, SHA1, and SHA256 are methods of collecting input data in units of 64 bytes to calculate a digest value, and SHA384 and SHA512 are methods of calculating a digest value in units of 128 bytes. For this reason, according to the length of input text, the input text may not fill up a unit block for calculating an AV digest. The unit block may be completely filled up when padding data is input.

The hardware-based AM system described above can be implemented in various mobile devices, PCs, or embedded devices. In particular, a mobile device including the AM system can have the following characteristics. Since an AV solution can use a full scan function and several engines on a platform provided by the AM system, it is possible to have a malicious code detection rate similar to that of a PC. While a software-based mobile security solution mainly prevents infection of malicious codes through an application, real-time network monitoring and blocking functions can be provided on the above platform, and thus it is possible to prevent infection of malicious codes even when an application is updated or downloaded through a network. A virus scanning function provided on the basis of hardware is faster than a software-based solution, and a hardware-based security solution may have increased FW rules compared to a software-based firewall, so that a reduction in packet throughput can be prevented and a high network transmission rate can be ensured. Also, battery use of a mobile device can be reduced compared to a case of using a software-based security solution. Furthermore, on the aforementioned platform, it is possible to easily cope with new malicious codes by updating a database and firmware, and in terms of expandability, a virus database can be applied by various vendors.

Meanwhile, an exemplary embodiment of the present disclosure may include a computer-readable recording medium including a program for performing the predetermined methods described herein on a computer. The computer-readable recording medium may separately include program commands, local data files, local data structures, etc. or include a combination of them. The medium may be specially designed and configured for the present disclosure. Examples of the computer-readable recording medium include magnetic media, such as a hard disk, a floppy disk, and a magnetic tape, optical recording media, such as a CD-ROM and a DVD, magneto-optical media, such as a floptical disk, and hardware devices, such as a ROM, a RAM, and a flash memory, specially configured to store and perform program commands. Examples of the program commands may include high-level language codes executable by a computer using an interpreter, etc. as well as machine language codes made by compilers.

In certain exemplary embodiments, a computing device having limited resources can provide improved AV performance.

In certain exemplary embodiments, operations for providing an AV function are performed at a high speed in a hardware-based AV engine, and other AV operations are implemented in a software level of a platform including the AV engine so that various security solutions can be provided.

It will be apparent to those familiar with this field that various modifications can be made to the above-described exemplary embodiments of the present disclosure without departing from the spirit or scope of the present disclosure. Thus, it is intended that the present disclosure covers all such modifications provided they come within the scope of the appended claims and their equivalents.

What is claimed is:

1. An anti-malware (AM) apparatus, comprising:
   a hardware-based anti-virus (AV) engine configured to perform hash matching on data for AV scanning of the data, and to generate a hash matching result; and
   an AV function module configured to determine whether the data includes a virus pattern, on the basis of the hash matching result,
   wherein the hardware-based AV engine includes:
   a hash loader configured to perform a first hash matching operation on a first portion of the data, and
   a suffix matcher configured to perform a second hash matching operation on a second portion of the data in response to detecting that a matching occurs in the first hash matching operation, the second portion of the data being subsequent to said first portion of the data.

2. The AM apparatus of claim 1, wherein the hardware-based AV engine further includes an AV digest unit configured to calculate a message digest of the data.

3. The AM apparatus of claim 2, wherein:
   said first portion of the data, when input to the hash loader, is input to the AV digest unit; and
   the calculation of the message digest is performed in parallel with at least one of the first hash matching operation and the second hash matching operation.

4. The AM apparatus of claim 2, wherein the AV digest unit temporarily pauses the hash loader to prevent the hash loader from performing a hash matching operation on a subsequent portion of the data while the AV digest unit is calculating the message digest.

5. The AM apparatus of claim 1, wherein the AV function module loads, for use by the hardware-based AV engine, at least one of a hash matching database and the virus pattern.

6. The AM apparatus of claim 1, wherein the AV function module is implemented as firmware.

7. The AM apparatus of claim 1, wherein the AV function module is implemented as an application, said application being executed by an external CPU in cooperation with the hardware-based AV engine.

8. The AM apparatus of claim 6, wherein the hardware-based AV engine includes a central processing unit (CPU) and a memory, and wherein the firmware implementing the AV function module is stored in the memory.

9. The AM apparatus of claim 1, wherein the hardware-based AV engine is integrated with a processor, and wherein the processor includes a security execution environment module configured to virtualize the processor into different processors respectively corresponding to a normal mode and a security mode.

10. The AM apparatus of claim 9, wherein the virtualized processor corresponding to the security mode is configured to execute an application received by the AM apparatus.

11. The AM apparatus of claim 9, further comprising a storage device connected to the processor, wherein the security execution environment module further virtualizes the storage device into different storage devices respectively corresponding to the normal mode and the security mode.

12. The AM apparatus of claim 11, wherein the virtualized storage device corresponding to the security mode stores at least one of a library related to the AM apparatus, a driver related to the AM apparatus, and the virus pattern.

13. A method of processing data in an anti-malware (AM) apparatus, comprising:
    performing, hash matching on data for AV scanning of the data, with a hardware-based anti-virus (AV) engine;
    generating a hash matching result; and
    determining, at an AV function module, whether the data includes a virus pattern, on the basis of the hash matching result,
    wherein the performing of the hash matching includes:
    performing, at a hash loader of the hardware-based AV engine, a first hash matching operation on a first portion of the data;
    performing, at a suffix matcher of the hardware-based AV engine, a second hash matching operation on a second portion of the data in response to detecting that a matching occurs in the first hash matching operation, the second portion of the data being subsequent to said first portion of the data.

14. The method of claim 13, further comprising calculating, at an AV digest unit of the hardware-based AV engine, a message digest of the data.

15. The method of claim 14, wherein:
    said first portion of the data, when input to the hash loader, is input to the AV digest unit; and
    the calculation of the message digest is performed in parallel with at least one of the first hash matching operation and the second hash matching operation.

16. The method of claim 14, further comprising using the AV digest unit to temporarily pause the hash loader to prevent the hash loader from performing a hash matching operation on a subsequent portion of the data while the AV digest unit is calculating the message digest.

17. The method of claim 13, further comprising loading at least one of a hash matching database and the virus pattern for use by the hardware-based AV engine.

18. The method of claim 13, further comprising providing the AV function module implemented as firmware.

19. The method of claim 13, further comprising providing the AV function module implemented as an application, said application being executed by an external CPU in cooperation with the hardware-based AV engine.

20. The method of claim 18, wherein the hardware-based AV engine includes a central processing unit (CPU) and a memory, and wherein the providing of the AV function module includes storing the firmware in the memory.

21. The method of claim 13, further comprising:
using a security execution environment module to virtualize a processor integrated with the hardware-based AV engine into different processors respectively corresponding to a normal mode and a security mode,
wherein the security execution environment module is included in the processor.

22. The method of claim 21, further comprising executing an application using the AM apparatus on the virtualized processor corresponding to the security mode.

23. method of claim 21, further comprising virtualizing, at the security execution environment module, a storage device connected to the processor into different storage devices respectively corresponding to the normal mode and the security mode.

24. The method of claim 23, further comprising storing at least one of a library related to the AM apparatus, a driver related to the AM apparatus, and the virus pattern in the virtualized storage device corresponding to the security mode.

25. A computing device, comprising:
a CPU core, and
an anti-malware (AM) apparatus configured to provide a security platform on which an anti-virus (AV) software application is executed;
wherein the AM apparatus includes:
a hardware-based AV engine configured to perform hash matching on data for AV scanning of the data, and to generate a hash matching result; and
an AV function module configured to determine whether the data includes a virus pattern on the basis of the hash matching result,
wherein the hardware-based AV engine includes:
a hash loader configured to perform a first hash matching operation on a first portion of the data, and
a suffix matcher configured to perform a second hash matching operation on a second portion of the data in response to detecting that a matching occurs in the first hash matching operation, the second portion of the data being subsequent to said first portion of the data.

26. The AM apparatus of claim 1, wherein the suffix matcher receives information including a position of the first portion of the data at which it is detected that the matching occurs in the first hash matching operation.

* * * * *